United States Patent [19]
Petrak

[11] Patent Number: 5,655,781
[45] Date of Patent: Aug. 12, 1997

[54] UNITIZED RADIAL AND FACIAL SEAL

[76] Inventor: Gregory H. Petrak, 16488 W. 55th Dr., Golden, Colo. 80403

[21] Appl. No.: 372,774

[22] Filed: Jan. 13, 1995

Related U.S. Application Data

[63] Continuation-in-part of Ser. No. 15,475, Feb. 8, 1993, Pat. No. 5,421,592.

[51] Int. Cl.$^6$ .................................................. F16J 15/32
[52] U.S. Cl. ............................. 277/38; 277/152; 277/153
[58] Field of Search ................................ 277/24, 31, 37, 277/38, 152, 153

[56] References Cited

U.S. PATENT DOCUMENTS

| | | | |
|---|---|---|---|
| 4,428,586 | 1/1984 | Romero | 277/38 |
| 5,015,001 | 5/1991 | Jay | 277/152 |
| 5,018,750 | 5/1991 | Sparks et al. | 277/38 |
| 5,096,207 | 3/1992 | Seeh et al. | 277/152 |
| 5,183,269 | 2/1993 | Black et al. | 277/152 |
| 5,348,312 | 9/1994 | Johnston | 277/95 |
| 5,421,592 | 6/1995 | Petrak . | |

FOREIGN PATENT DOCUMENTS

| | | | |
|---|---|---|---|
| 3501906 | 9/1985 | Germany | 277/152 |
| 90/11463 | 10/1990 | WIPO | 277/152 |
| 91/13277 | 9/1991 | WIPO | 277/152 |

*Primary Examiner*—Scott W. Cummings
*Attorney, Agent, or Firm*—John E. Reilly

[57] ABSTRACT

A unitized radial and facial seal assembly intended for use between radially inner and outer relatively rotationally and axially movable members includes a facial seal which is disposed between axially spaced, radially extending flanges of a counterface and a retainer to prevent entry of external contaminants, a radial seal mounted on a casing and fixed against relative rotational and axial movement, and a wiper seal on the counterface which is disposed in sealing engagement with the radially inner member. One or more bearing members are disposed on the counterface for conjoint rotation with the radially inner member and cooperate with the wiper seal in maintaining a fixed axial relationship between the counterface and retainer. The relationship is such that the seals that rotate relative to their sealing surfaces are not exposed to axial reciprocation and the seals that undergo axial reciprocation are not exposed to relative rotation with respect to a sealing surface.

19 Claims, 4 Drawing Sheets

UNITIZED RADIAL AND FACIAL SEAL

Cross-Reference to Related Applications

This application is a continuation-in-part of Ser. No. 015,475, filed Feb. 8, 1993 for UNITIZED RADIAL AND FACIAL SEAL by Gregory H. Petrak now U.S. Pat. No. 5,421,592.

BACKGROUND AND FIELD OF INVENTION

The present invention relates to seals, and more particularly pertains to a unitized radial and facial seal intended principally for use between radially inner and outer relatively rotationally and axially movable members.

There are numerous applications in which relatively rotating members require a seal or seals to retain lubricant and exclude contaminants. Sealing a shaft in a contaminated environment while the shaft is simultaneously rotating and undergoing axial reciprocation presents a very difficult sealing problem. Conventional rotary shaft seal designs include lips intended to run on a very thin surface lubricant film on a rotating shaft. Failure or absence of the lubricant film results in high friction and attendant rapid wear of the sealing lip. Accordingly, in a rotating application, the force used to bias the sealing lip against the shaft should not therefore be so great as to cause the seal lip to break through the lubricant barrier which "wets" or adheres to the shaft surface. Due to the relatively low seal-to-shaft bias force, a seal designed to operate in a rotary application will fail in an axial reciprocating application because lubricating oil will bypass the sealing lip as the shaft moves axially. When the shaft moves to an axially extended position, contaminants will collect on the surface of the shaft. Subsequently axial retraction of the shaft tends to force the collected contaminants into the seal lip. The very fine and typically abrasive contaminant particles will pass under the seal lip because the seal-to-shaft bias force is not sufficient to break through the lubricant film. The contaminant particles will abrade both the sealing lip and the shaft and over time the shaft will become scored, resulting in lubricant leakage.

Conversely, a seal designed to operate in a reciprocating application, in the absence of rotation, relies upon a sufficient force being exerted upon the sealing lip to cause the lip to break through the lubricating film and run directly against the mating surface. Seals of this design are referred to as "wipers" because their function is to wipe lubricant from the shaft as the shaft moves from a retracted position to an extended position and to wipe contaminants from the shaft as it moves from an extended position back to a retracted position. A wiper seal will tend to wear out very quickly in a rotary application because it breaks through the lubricant film which adheres to the mating surface.

It is therefore desirable to isolate radial and facial seals so that they are only required to seal dynamically with respect to one plane or surface. For example, any radial seal that must seal against a rotating counterface should not also be subjected to a reciprocating motion of that counterface; and any facial seal that seals against a counterface that is reciprocating axially should not be exposed to rotational movement of that counterface.

SUMMARY OF THE INVENTION

It is therefore an object of the present invention to provide for a novel and improved radial and facial seal assembly capable of accommodating a wide range of manufacturing and assembly tolerances.

Another object of the present invention is to provide for a novel and improved unitized radial and facial seal assembly including a secondary labyrinth seal for preventing external contaminants which breach the facial seal from reaching the radial seal.

It is a further object of the present invention to provide for a novel and improved unitized radial and facial seal assembly for use between radially inner and outer rotationally and axially relatively movable members.

It is an additional object to provide for a novel and improved unitized radial and facial seal assembly in which radial and facial seal lips are isolated so that they are required to seal dynamically with respect to one plane or surface; and further wherein a wiper seal effects engagement between the seal assembly and a rotating shaft in such a way as to follow rotational movement of the shaft while being free to axially reciprocate with respect to the shaft in order to wipe away contamination and oil deposited upon the shaft, respectively, both outboard and inboard of the seal assembly itself; or the wiper seal may effect engagement with a fixed member and permit the seal assembly to follow axial movement of the shaft.

In accordance with the present invention, a seal assembly for installation between radially inner and outer relatively rotationally and axially movable members comprises a counterface mounted on one of the movable members, retainer means mounted on the other movable member in spaced relation to the counterface, an annular seal member, and said retainer means and said counterface defining a circumferential groove therebetween for insertion of the annular seal member therein. In the preferred form, the retainer means is mounted in fixed relation to the other relatively movable member, and the counterface is mounted on the one movable member in such a way as to follow its rotational movement while permitting its axial reciprocation with respect to the seal assembly, and bearing means serves to maintain the retainer means and counterface in fixed axial relationship to one another notwithstanding axial reciprocation or movement between the relatively movable members. To this end, a seal wiper may be mounted either between the counterface and its associated movable member or between the retainer means and its associated movable member to permit the movable member contacted by the wiper seal to axially reciprocate with respect to the seal assembly and maintain the desired fixed axial relationship between the retainer means and counterface for most effective sealing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It

3 is important, therefore, that the claims be regarded as including such equivalent constructions insofar as they do not depart from the spirit and scope of the present invention.

DETAILED DESCRIPTION OF PREFERRED EMBODIMENT

Figure 1:
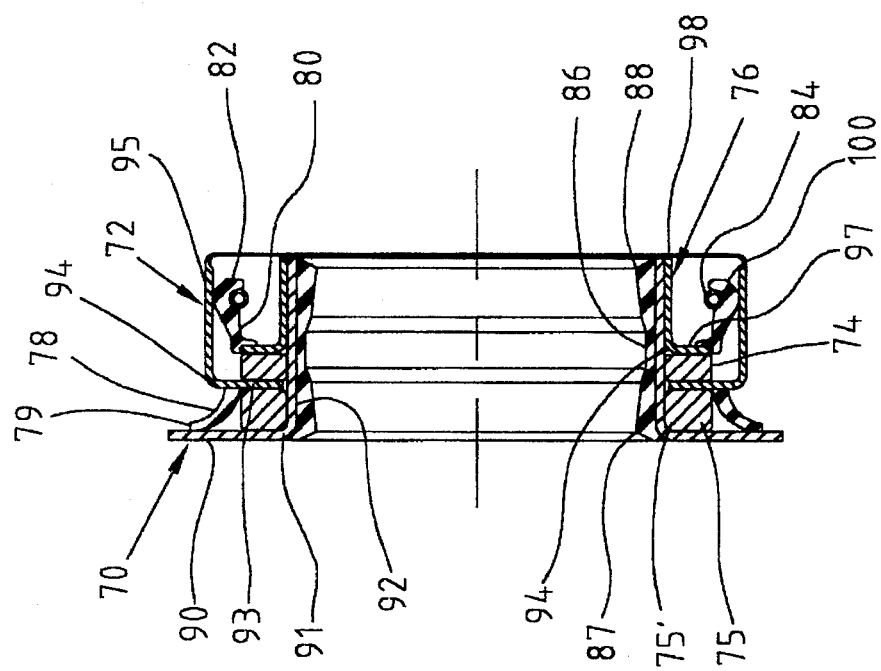
FIG. 1 is a longitudinal section view of a preferred embodiment of the present invention.

There is illustrated in FIGS. 1 to 4 a preferred form of unitized radial and facial seal assembly which is broadly comprised of an annular facial counterface 70, an annular retainer or radial counterface 72 fixed in relation to the facial counterface 70 by axially spaced bearing members 74 and 75 together with a radial seal casing 76. An annular facial seal 78 is affixed to the radial counterface 72 and diverges away from the counterface to terminate in a seal lip 79 which engages the facial counterface 70 radially outwardly of the bearing 75. An annular radial seal 80 is affixed at one end to the annular seal casing 76 and diverges radially and outwardly to terminate in a seal lip 82 which is biased against the radially inside surface of the counterface 72 by a circumferentially extending garter spring 84. An annular seal wiper 86 is molded or otherwise permanently affixed to the radial inner surface of the counterface 70 and includes a pair of axially spaced wiper lips 87 and 88.

Figure 4:
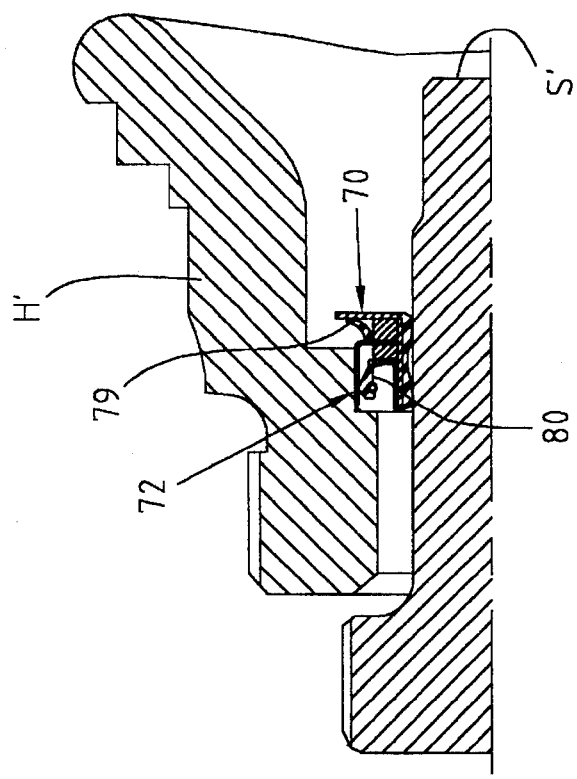
FIG. 4 is another half-sectional view of the seal assembly shown in FIG. 3 with the shaft disposed in an axially extended position.
Figure 3:
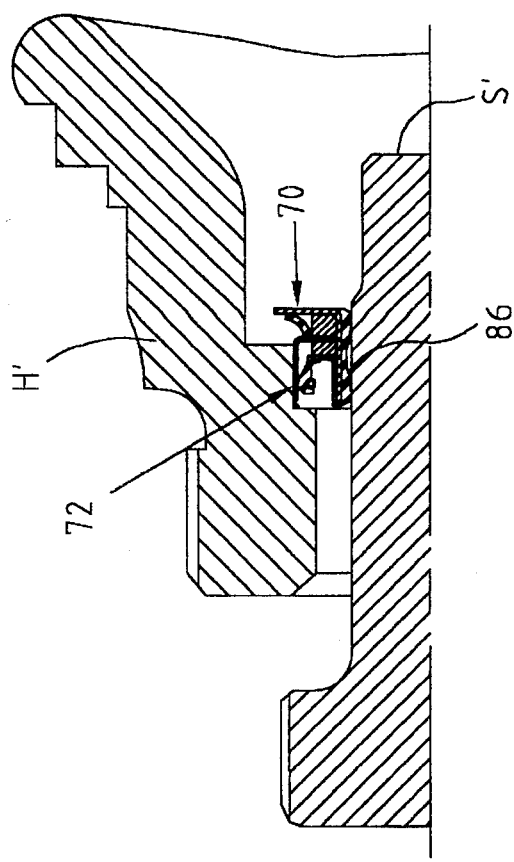
FIG. 3 is a half-sectional view of the seal assembly installed between an outer stationary housing and a rotary and axially reciprocal shaft disposed in an axially retracted position.

The counterface 70 is made up of a radially extending annular flange portion 90 connected by a 90° radius bend 91 to an axially extending cylindrical wall portion 92 which forms a central circular aperture to which the wiper 86 is affixed and which insures tight-fitting sealed engagement of the counterface to a rotating shaft S, as best seen from FIGS. 3 and 4.

The retainer 72 is in the form of a radial seal counterface having a radially extending annular portion 93 connected by a radius bend 94 to an axially extending cylindrical wall portion 95 which is dimensioned for snug-fitting insertion into the housing H. Each of the bearing members 74 and 75 is of annular configuration and composed of a substantially rigid, self-lubricating plastic or like material, the bearing member 75 being slightly thicker than the bearing 74 and having a radially inward rounded inner surface portion 75' to conform to the radius bend 91 of the counterface 70. In this relation, the outer bearing 75 is sandwiched between the radial flange 90 and the radial flange 93 whereby to maintain a fixed axial relationship therebetween. In turn, the inner bearing member 74 is sandwiched between the radial flange

4

93 and a radial flange 97 of the casing 76, the casing 76 also having a flange portion 98 extending axially away from the radially inner end of the flange portion 97, and the flange portion 98 being permanently affixed to the outer circumferential surface of the flange portion 92 of the counterface 70. In this manner, a fixed axial relationship is established between the counterfaces 70, 72 and seal casing 76 while permitting relative rotation of the counterface 70 and casing 76 with respect to the radial counterface 72.

The facial seal 78 is composed of a rubber or rubber-like material having a radially inner edge molded to the radial flange 93 of the counterface 72 and diverging outwardly very much in the form of a skirt to terminate in a lip 79 bearing against a radial seal surface defined by the inboard side of the flange portion 90 of the counterface 70. The radial seal 80 is composed of a rubber or rubber-like material and is of annular configuration having one end molded to the flange portion 97 of the casing 76 and diverging in an outboard direction away from the flange portion 97 to bear against the inner circumferential surface of the counterface 72 as previously described.

In a typical application, the radial counterface 72 is installed in pressfit relation into the housing H in an elongated bore which receives a rotating and axially reciprocating shaft S. The shaft S may, for example, be a vehicle axle, and the stationary housing H a differential trunnion which includes a counterbore C coaxial with the shaft S. The outer diameter of the counterface 72 is dimensioned to establish a pressfit relationship with the counterbore C, and the seal wiper 86 is dimensioned to compress the wiper lips 87 and 88 between the rotating shaft S and axial wall 92 of the counterface 70. The shaft S is free to slide axially with respect to the seal assembly and may do so while causing the counterface 70, casing 76 and seal 80 to rotate with the shaft S and at the same speed as the shaft S due to the compressive fit of the wiper 86 as described. Accordingly, the facial counterface 70 and wiper lips 87, 88 remain stationary relative to the axially sliding movement of the shaft S and the lips 87, 88 will serve to wipe away contamination and oil deposited upon the shaft, respectively, outboard and inboard of the seal assembly. The facial seal 78 is molded to the radial counterface 72 and therefore does not rotate and is fixed axially with respect to its mating surface on the facial counterface 70. The radial seal 80 will rotate while sealing against the fixed, non-rotating radial counterface 72. Thus, the radial seal 80 and the facial seal 78 will not be subjected to any kind of relative axial motion of their respective counterfaces.

From the foregoing, the facial seal 78 and radial seal 80 are exposed to, or undergo, rotation with respect to a sealing surface of a counterface but neither seal is free to move axially in relation to its respective mating or sealing surface. The wiper seal 86 is the only seal exposed to axial reciprocating motion but does not rotate relative to the shaft S. Accordingly, the seals that rotate relative to their sealing surfaces are not exposed to axial reciprocation relative to those surfaces, and the seals that experience axial reciprocation are not exposed to relative rotation with respect to a sealing surface thereby achieving vastly improved sealing in applications of the type described while avoiding premature wear and leakage.

DETAILED DESCRIPTION OF MODIFIED FORMS OF INVENTION

Figure 2:
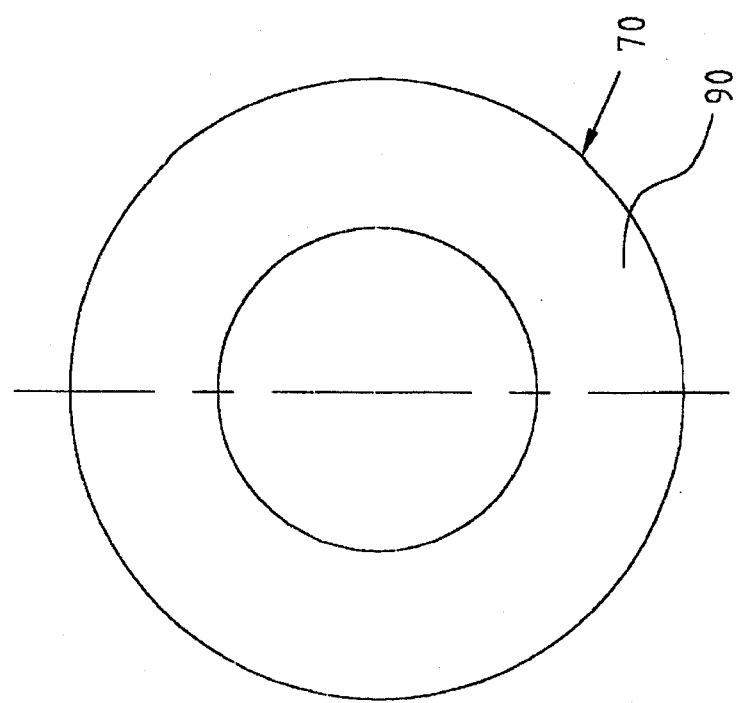
FIG. 2 is an end view of the embodiment shown in FIG. 1.
Figure 5:
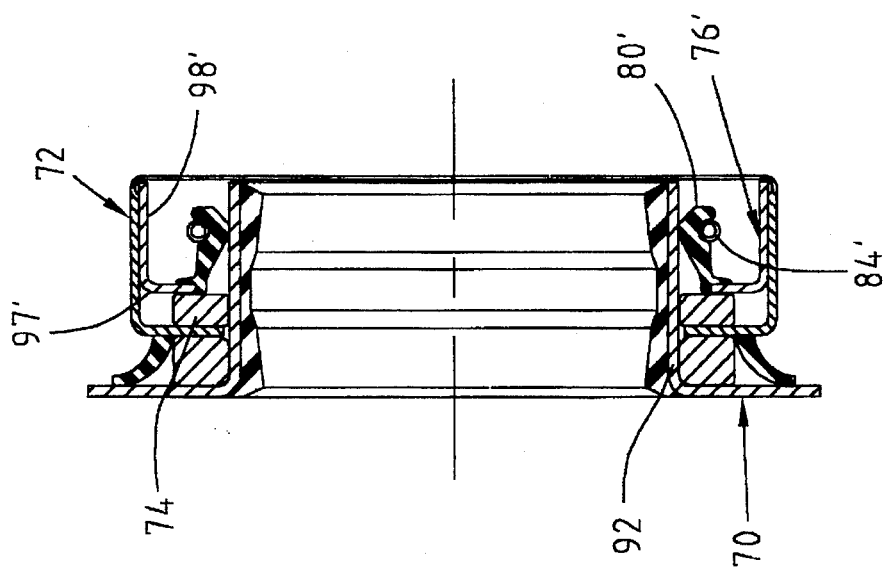
FIG. 5 is a sectional view of a modified form of the present invention.
Figure 6:
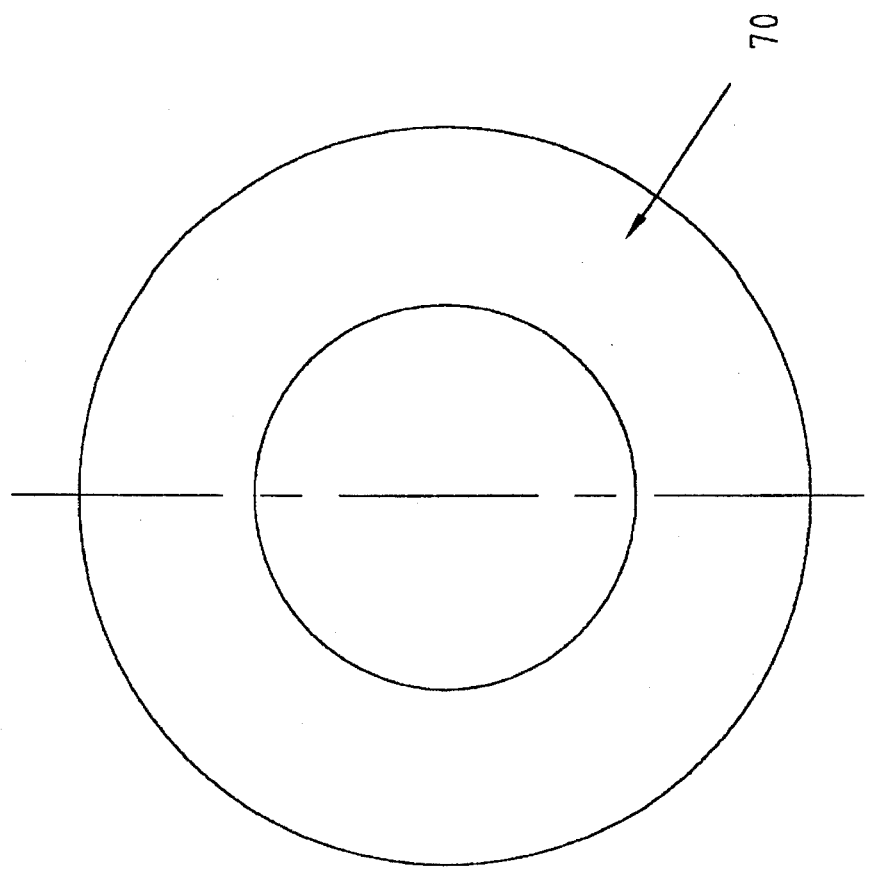
FIG. 6 is an end view of the form of invention shown in FIG. 5.

There are illustrated in FIGS. 5 to 8 modified forms of invention in which like parts to those of FIGS. 1 and 2 are correspondingly enumerated and modified elements are designated with prime numerals. As shown in FIGS. 5 and 6, an annular casing 76' is dimensioned such that its axial flange portion 98' is affixed to the inner surface of the wall portion 95 of the retainer 72, and radial flange 97' extends radially and inwardly behind the bearing member 74. The seal 80' is affixed to the radially inward edge of the flange 97 and converges inwardly in a radial direction against the cylindrical wall portion 92 of the counterface 70. As in the preferred form, a fixed axial relationship is established between the counterfaces 70, retainer 72 and the seal casing 76', but only the counterface 70 is free to rotate relative to the retainer 72 and casing 76'. The spring element 84' is mounted under tension in surrounding relation to the seal 80' to urge the free convergent end of the seal radially and inwardly into sealed relation to the wall portion 92 of the counterface 70.

Figure 7:
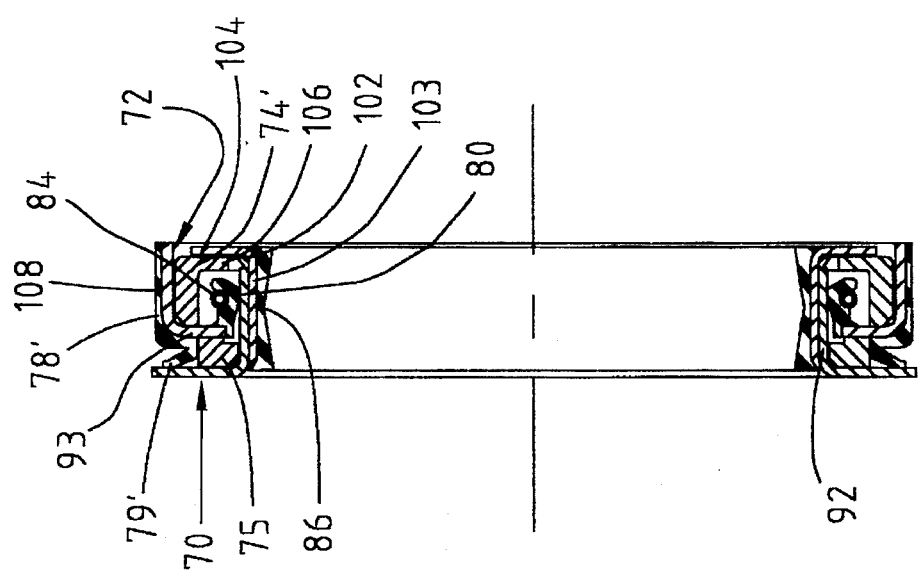
FIG. 7 is a longitudinal sectional view of a modified form of the present invention.

FIG. 7 illustrates another form of the present invention in which a fixed axial relationship is maintained between the counterface 70, radial counterface or seal retainer 72 and a seal casing 102 while permitting relative rotation of the counterface 70 and casing 102 with respect to the radial counterface or seal retainer 72. In this form, however, the casing 102 has an axially extending portion 103 affixed to and coextensive with the radial inner surface of the cylindrical wall 92 of the counterface 70, and the wiper seal 86 is molded to the radial inner surface of the axially extending portion 103 of the casing 102. The radial flange portion 104 of the casing 102 extends radially and outwardly from the portion 103 to serve as a limit stop for the bearing 74' which is disposed in outer surrounding relation to the seal 80. The bearing 74' is dimensioned to extend between the radial flange 93 of the retainer 72 axially along and within the retainer 72 and to terminate in an inward radial projection 106, the latter bearing against the flange portion 104. The facial seal 78' terminates in a seal lip 79' which engages the counterface 70 at a point radially outwardly of the bearing 75 as in the preferred form but includes an axial extension 108 molded to the outer surface of the retainer 72 to assist in establishing a press-fit relationship between the retainer 72 and a housing, not shown, so that the seal assembly is maintained in fixed relationship to the housing. As in the preferred form, a shaft, not shown, is free to slide axially with respect to the seal assembly but the counterface 70 and casing 102 will rotate with the shaft independently of the stationary retainer 72 and seals 78' and 80.

Figure 8:
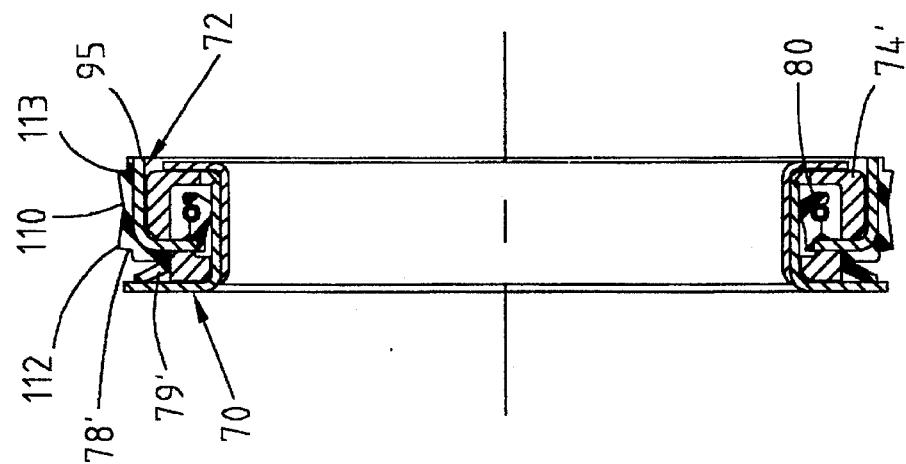
FIG. 8 is a longitudinal sectional view of still another modified form of the present invention.

A somewhat reverse relationship is established in FIG. 8 wherein the wiper seal 86 is removed from the inner surface of the casing 102 and a modified form of facial seal 78' includes a wiper seal extension 110 along the external surface of the wall portion 95 of the retainer 72 so that the wiper lips 112 and 113 engage an axially extending surface portion of a housing, not shown. However, the casing 102 is mounted in press-fit relation to the shaft, not shown, so that the entire seal assembly will follow both axial and rotational movement of the shaft but will be free to slide axially with respect to the housing. The wiper seal 110 will remain fixed to the housing so that the counterface 70 and casing 102 will rotate independently of the retainer 72 as well as the facial seal 78' and radial seal 80.

In a manner similar to that of FIGS. 5 and 6, in the seal assemblies of FIGS. 7 and 8, both the facial seal 78 and radial seal 80 establish sealed engagement with relatively rotating sealing surfaces but do not move axially in relation to the respective sealing surfaces irrespective of whether the wiper seal 86 or 110 engages the shaft S or housing H.

It is therefore to be understood that even though numerous characteristics and advantages of the present invention have been set forth in the foregoing description, together with details of the structure and function of the invention, the disclosure is illustrative only, and changes may be made in detail, especially in matters of materials, shape, size and arrangement of parts within the principles of the invention to the full extent indicated by the broad general meaning of the terms in which the appended claims are expressed and reasonable equivalents thereof.

I claim:

1. In a seal assembly for installation between radially inner and outer relatively rotationally and axially movable members comprising:

a counterface mounted on one of said movable members;

retainer means mounted on another of said movable members in fixed axial relation to said counterface;

an annular seal member;

said retainer means and said counterface defining a circumferential groove therebetween for insertion of said annular seal member therein in sealed relation to said counterface; and wherein said retainer means includes a radially inwardly extending flange portion and said counterface includes a radially outwardly extending flange portion, at least one bearing member disposed on said counterface, and said annular seal disposed radially outwardly of said bearing member between said flange portions.

2. In a seal assembly according to claim 1, each of said retainer means and said counterface having radially extending portions in axially spaced relation to one another defining said circumferential groove.

3. In a seal assembly according to claim 1, wherein one of said counterface and said retainer means is movable axially with respect to said movable member upon which it is mounted and the other of said counterface and said retainer means is fixed axially and rotationally with respect to said movable member upon which it is mounted.

4. A seal assembly for installation between radially inner and outer relatively rotationally and axially movable members comprising:

a first counterface mounted in sealed relation to one of said relatively movable members;

retainer means mounted in sealed relation to another of said relatively movable members;

a first seal mounted on said retainer means in sealed relation to said first counterface;

a second seal mounted on one of said first counterface and said retainer means in sealed relation to the other of said retainer means and said first counterface; and bearing means disposed between said first counterface and said retainer means for maintaining said first counterface and said retainer means in fixed axial relation to one another notwithstanding relative axial and rotational movement between said movable members.

5. A seal assembly according to claim 4, wherein said first counterface includes means for mounting said first counterface on said one movable member whereby to follow rotational movement of said one movable member.

6. A seal assembly according to claim 5, wherein said mounting means is axially slidable with respect to said one movable member whereby to cooperate with said bearing means in maintaining a fixed axial relationship between said first counterface and said retainer means notwithstanding axial movement of said one movable member.

7. A seal assembly according to claim 4, wherein said mounting means is in the form of a wiper seal having axially spaced, circumferentially extending lips in sealed engagement with said one movable member.

8. A seal assembly according to claim 7, wherein said first counterface includes a circumferentially extending wall portion, said wiper seal mounted on a radially inner circumferential surface of said circumferentially extending wall portion.

9. A seal assembly according to claim 4, wherein said first counterface includes an annular, radially extending sealing surface at one end and said first seal is mounted in sealed relation to said sealing surface.

10. A seal assembly according to claim 4, wherein said bearing means includes a pair of axially spaced, annular bearing members, and said retainer means includes a second counterface having an annular, radially extending flange portion interposed between said bearing members.

11. A seal assembly according to claim 10, wherein said first counterface includes limit stop means extending radially outwardly from said first counterface in axially spaced relation to one end of said first counterface, said bearing members being interposed between said limit stop means and said one end of said first counterface.

12. A seal assembly according to claim 11, wherein said second seal is mounted on said limit stop means, and biasing means for yieldingly urging said second seal in a radially outward direction into sealed engagement with an inner circumferential surface of said retainer means.

13. A seal assembly according to claim 4, wherein said first seal diverges in a radially outward direction into engagement with said first counterface.

14. A seal assembly for installation between radially inner and outer relatively rotationally and axially movable members comprising:

a first annular counterface mounted in sealed relation to one of said relatively movable members and having a radial flange;

a second annular counterface mounted in sealed relation to another of said relatively movable members and having a radial flange;

a facial seal mounted on said second counterface in sealed relation to a radially extending surface of one of said first and second counterfaces; and bearing means disposed between said first and second counterfaces for maintaining said radial flanges of said first and second counterfaces in fixed axial relation to one another notwithstanding relative axial and rotational movement between said movable members.

15. A seal assembly according to claim 14, wherein said first counterface includes means for mounting said first counterface on said one movable member whereby to follow rotational movement of said one movable member, said mounting means being axially slidable with respect to said one movable member whereby to cooperate with said bearing means in maintaining a fixed axial relationship between said first and second counterfaces notwithstanding axial movement of said one movable member.

16. A seal assembly according to claim 15, wherein said mounting means is in the form of a wiper seal having axially spaced, circumferentially extending lips in sealed engagement with said one movable member.

17. A seal assembly according to claim 14, wherein said second counterface includes means for mounting said second counterface on said other relatively movable member whereby to follow rotational movement thereof while being axially slidable with respect to said other movable member whereby to cooperate with said bearing means in maintaining a fixed axial relationship between said first and second counterfaces notwithstanding axial movement of said one movable member.

18. A seal assembly according to claim 17, wherein said mounting means is defined by a wiper seal on a circumferentially extending surface portion of said second counterface for sealed engagement with said other movable member.

19. A seal assembly according to claim 14, wherein said bearing means includes a pair of axially spaced, annular bearing members, and said second counterface having an annular radially extending flange portion interposed between said bearing means, one of said bearing members disposed in outer spaced concentric relation to said radial seal.

* * * * *